United States Patent [19]

Ghodsizadeh

[11] Patent Number: 5,030,473
[45] Date of Patent: Jul. 9, 1991

[54] CRYOGENIC AROMA RECOVERY

[75] Inventor: Yousef Ghodsizadeh, Worthington, Ohio

[73] Assignee: Nestec S.A., Vevey, Switzerland

[21] Appl. No.: 49,039

[22] Filed: Apr. 30, 1987

Related U.S. Application Data

[63] Continuation of Ser. No. 729,252, May 1, 1985, abandoned.

[51] Int. Cl.[5] .......................... A23F 3/42; A23F 5/48; A23L 1/221
[52] U.S. Cl. ..................................... 426/650; 426/651; 426/594; 426/597; 426/613; 426/386; 426/475; 426/478
[58] Field of Search ............... 426/475, 386, 613, 594, 426/597, 650, 651, 478

[56] References Cited

U.S. PATENT DOCUMENTS

| | | | |
|---|---|---|---|
| 2,306,061 | 12/1942 | Jolinston | 426/386 X |
| 2,680,687 | 6/1954 | Lemonnier | 426/386 |
| 2,738,276 | 3/1956 | Bleuch | 426/386 X |
| 3,535,118 | 10/1970 | Klein et al. | 426/386 |
| 3,783,163 | 1/1974 | Patel | 426/386 X |
| 3,821,447 | 6/1974 | Jasovsky et al. | 426/386 |
| 3,823,241 | 7/1974 | Patel et al. | 426/386 |
| 4,232,598 | 11/1980 | Hurlow et al. | 426/386 |
| 4,313,265 | 2/1982 | Dwyer | 426/386 X |

FOREIGN PATENT DOCUMENTS

| | | |
|---|---|---|
| 0010804 | 5/1980 | European Pat. Off. . |
| 0028043 | 5/1981 | European Pat. Off. . |
| 246454 | 10/1926 | United Kingdom ............... 426/386 |
| 1480997 | 1/1977 | United Kingdom . |

Primary Examiner—Joseph Golian
Attorney, Agent, or Firm—Vogt & O'Donnell

[57] ABSTRACT

A process for recovering volatile aroma components from aroma-bearing vegetable materials such as roast and ground coffee. A carrier gas is passed through the vegetable material to strip aromas therefrom, and the resulting aroma-laden gas is contacted with a cryogenic liquid such as liquid nitrogen to condense the aromas from the gas. The carrier gas has a boiling point equal to or lower than that of the cryogenic liquid. Because the efficacy of the condensation step is substantially independent of the gas flow rate, the optimum gas flow rate for effective stripping may be used without loss of aromas at the condensation step.

16 Claims, 1 Drawing Sheet

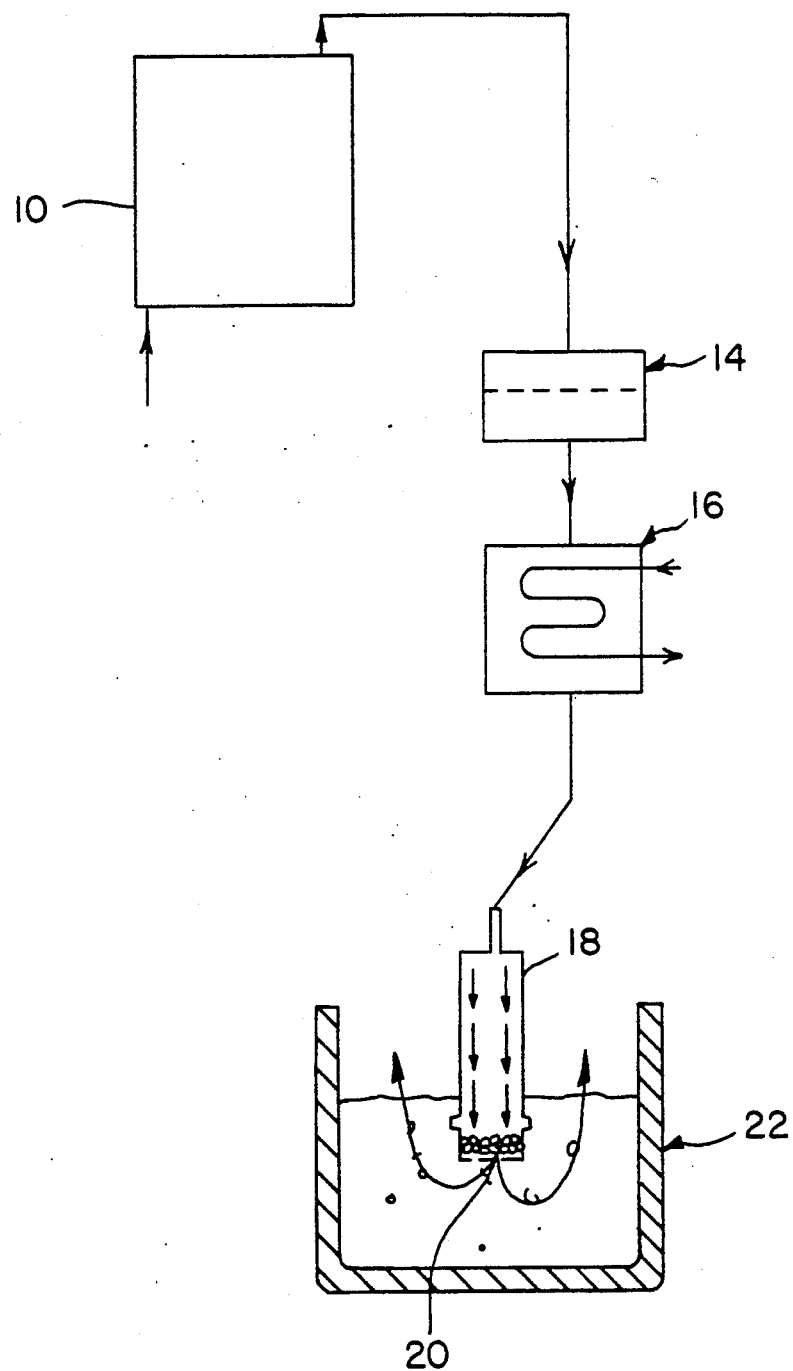

CRYOGENIC AROMA RECOVERY

This is a continuation application of co-pending application Ser. No. 06/729,252, filed May 1, 1985, now abandoned.

BACKGROUND OF THE INVENTION

Vegetable materials such as roasted coffee beans and tea leaves incorporate volatile compounds which contribute to the flavor and/or aroma of a beverage prepared from the vegetable material. Those compounds are referred to in this disclosure as "aromas." The extraction, concentration and drying steps normally utilized in industrial production of soluble beverage powders such as "instant" coffee or tea typically result in some loss and degradation of the aromas. Accordingly, various efforts have been made to recover the aromas from the vegetable material at the beginning of the process, and then return the aromas to the product at or near the end of the process. However, the aroma recovery techniques heretofore available have not been entirely satisfactory. Typically, such techniques remove only a relatively small proportion of the aromas from the vegetable material or lose a significant portion of the aromas removed from the vegetable material.

SUMMARY OF THE INVENTION

The present invention provides an improved aroma recovery process which alleviates those difficulties.

In a process according to the present invention, an inert carrier gas is passed through a particulate, aroma-bearing vegetable material to strip the aromas therefrom. The resulting aroma-laden gas is contacted directly with a cryogenic liquid, as by passing the gas into the liquid, to condense the aromas in solid form from the gas. The cryogenic liquid preferably is liquid nitrogen, and preferably is maintained at about $-195°$ C. or less. The solid aromas are separated from the cryogenic liquid. The recovered aromas may be incorporated into soluble beverage powder or other products.

The present invention incorporates the discovery that the efficacy of aroma condensation by direct contact of the gas with a cryogenic liquid is substantially independent of the gas flow rate. Under any practical conditions, substantially all of the aromas in the gas stream directed to the condensation step are condensed, regardless of the gas flow rate. Accordingly, the carrier gas flow rate through the stripping step preferably is high enough to strip the aromas from the vegetable material effectively. The present invention thus provides optimization of both the stripping and condensation steps in a single process.

Preferably, the carrier gas employed has a boiling temperature equal to or lower than the temperature of the cryogenic liquid, so that the carrier gas does not condense with the aromas. A solid substrate may be interposed at the zone of contact between the gas stream and the cryogenic liquid, so that the aromas condense on the substrate. Preferably, the substrate is a material which tends to bind or adsorb the aromas. Such a substrate minimizes loss of aromas upon warming of the aromas after separation from the cryogenic liquid.

BRIEF DESCRIPTION OF THE DRAWING

The figure is a schematic flow chart depicting one embodiment of the present invention.

DETAILED DESCRIPTION OF THE EMBODIMENTS

In process according to one embodiment of the present invention, a batch of freshly roasted coffee, ground to a particle size of about 2 mm, is charged into an enclosed stripping chamber 10. The chamber is heated to maintain the coffee at the desired temperature and rotated to agitate the coffee particles. A continuous stream of dry nitrogen carrier gas is introduced into the chamber and passes through the agitated mass of coffee particles within the chamber, the chamber being maintained under a slight superatmospheric pressure. As the carrier gas contacts the roast and ground coffee, it sweeps aromas from the coffee particles, and also absorbs water vapor and carbon dioxide evolved by the coffee. A stream of aroma-laden gas passes from the stripping chamber through a filter 14, which traps any entrained roast coffee, and then passes through a pre-condenser or heat exchanger 16 which is cooled by chilled water. Water vapor condenses from the gas stream in the precondenser, together with the least volatile or highest boiling aromas.

Aroma-laden gas at about room temperature passes from the precondenser into the upper or upstream end of a vertical conduit or trap 18 having a fine wire mesh screen 20 covering its lower or downstream end. The downstream end of the conduit is immersed in a bath of a liquid nitrogen maintained in equilibrium at its atmospheric-pressure boiling temperature in an open, insulated vessel or Dewar flask 22. A thin bed of a particulate substrate is disposed atop screen 20. The pressure of gas entering conduit 18 displaces any liquid nitrogen from within the conduit, and maintains the gas/liquid interface at the lower end of the conduit. Thus, the upstream portion of the conduit is filled with gas, but the liquid nitrogen remains in contact with the screen and with the substrate layer. Gas continually emerges from the downstream end of the conduit, through the substrate and screen, and bubbles up through the liquid nitrogen in the vessel along with gaseous nitrogen evolved from the liquid bath. The gasses emerging from the bath are vented to the atmosphere.

As the aroma-laden gas flowing downstream in the conduit passes through the substrate and into the liquid nitrogen, the gas is cooled almost instantaneously to the temperature of the liquid nitrogen ($-195°$ C.). The aromas and carbon dioxide in the gas condense on the substrate and on screen 20. At the temperature prevailing in the conduit, the carbon dioxide forms a solid frost. The aromas either freeze or are adsorbed on trap and/or substrate. Accordingly, the condensed aromas are collected in solid form, in the frost and substrate on the upstream side of the screen.

After the desired quantity of aromas has been stripped from the coffee and collected in the trap, the gas flow is stopped. The solid aromas in the trap 18 are separated from the liquid nitrogen by lifting the trap and screen out of the Dewar flask. Any liquid nitrogen which may have entered the conduit upon cessation of the gas flow drains back through the screen into the bath. The solid aromas are then prepared for incorporation into the coffee product. The aromas may be incorporated into instant coffee by conventional techniques, which typically involve incorporation of the aromas into a blending liquid such as concentrated coffee extract, an edible oil or an emulsion of edible oil in coffee extract. The blending liquid may then be applied to an instant coffee powder or a similar product. Alternatively, the blending liquid may be dried and the resulting dry product may be blended with instant coffee powder or a similar product.

The recovered aromas typically must be warmed to above the freezing point of the blending liquid. Upon warming, the carbon dioxide solidified with the aromas vaporizes. The aromas may be warmed in a closed container together with the substrate, while retaining the carbon dioxide. The warmed aromas bind to the substrate during the warming process, so that when the carbon dioxide is ultimately released, only an insignificant proportion of the aromas is lost with the carbon dioxide. Further to suppress aroma loss during the warming step, the solid aromas and substrate may be immersed in the blending liquid and warmed by contact therewith so that aromas evolved in gaseous form during warming are absorbed into the blending liquid.

Suitable aroma-binding substrates include edible oils or glycerides, carbohydrates, aqueous coffee extract, soluble coffee powder, and combinations thereof in frozen particulate form. A mixture or emulsion of concentrated coffee extract and an edible oil is preferred, and a mixture containing about 2 parts by weight of coffee extract containing about 45% by weight coffee solids with 1 part by weight edible oil is particularly preferred.

Preferably, about 7.5g of substrate, containing about 2.5g of oil, are used in the trap for each kg of roast and ground coffee stripped. The aroma recovery process may be operated on a stoichiometric basis with the other steps utilized to convert the roast and ground coffee, after stripping, into soluble coffee powder. In such operation, the aroma and substrate mixture derived from a given amount of roast and ground coffee are blended with soluble coffee powder derived from the same amount of roast and ground coffee. When the preferred amount of substrate is used, stoichiometric operation results in addition to the soluble coffee powder of about 0.5% by weight of oil from the substrate. Such quantities of oil can be accomodated in the powder without causing an unslightly oil slick in the reconstituted beverage.

A lesser quantity of substrate may be employed, or the substrate may be omitted entirely, without appreciable adverse effect on the aroma recovery process. If the substrate is omitted, however, particular care should be taken to minimize loss of aromas after recovery, as during the warming operation incident to incorporation of the aromas into the final product.

The relatively non-volatile, high boiling aromas collected in the precondenser may also be incorporated in the final product, as by addition to the blending liquid along with the more volatile aromas recovered in the trap. Ordinarily, however, the aromas collected in the precondenser, having boiling points above about 0° C., do not materially enhance the final product, and these aromas may be discarded. The precondenser may be omitted, in which case all of the aromas will be collected in the nitrogen-cooled trap along with ice derived from the water vapor in the gas stream. As this variant imposes significant additional heat input on the liquid nitrogen bath, it is less preferred.

In a further variant, an additional precondenser operating at an intermediate temperature may be interposed between the first precondenser and the trap to further cool the gas stream, thereby to minimize heat input to the liquid nitrogen bath, and hence evaporation of the liquid nitrogen. The aromas collected in the additional precondenser may be blended with the final product or discarded as desired. The precooler and the additional precondenser may operate at or below the sublimation temperature of carbon dioxide ($-78.5°$ C.). If the additional precondenser is operated below the sublimation temperature of carbon dioxide, it will remove the carbon dioxide from the gas stream before it reaches the trap. In this variant, the aromas recovered in the trap are substantially free of carbon dioxide and hence less susceptible to loss associated with vaporization of the carbon dioxide during warming. Although the medium-volatility aromas collected in the additional precondenser are associated with solid carbon dioxide, these aromas are believed to be less valuable and less susceptible to loss during warming than the highly volatile aromas collected at the trap.

Other cryogenic liquids may be substituted for the liquid nitrogen referred to above. Any cryogenic liquid utilized in the process should be substantially non-reactive with the aromas, should be non-toxic, and should have a freezing point well below the desired liquid temperature. The cryogenic liquid preferably is maintained at a temperature of about $-195°$ C. during the process. Although lower temperatures may be employed, they offer no practical advantage because substantially complete aroma recovery from the gas stream is achieved at $-195°$ C. Substantially higher cryogenic liquid temperatures provide less complete recovery, and hence are less preferred.

Carrier gases other than nitrogen may be used. The carrier gas should be non-reactive with the aromas and non-toxic, and should have a boiling point equal to or lower than the cryogenic liquid temperature used in the process. Nitrogen is the preferred carrier gas. If liquid nitrogen is used as the cryogenic liquid, a portion of the nitrogen gas evolved from the liquid bath may be collected and used as the carrier gas.

Preferably, the boiling point of the carrier gas, under the pressure prevailing at the interface between the gas stream and the cryogenic liquid, is equal to or less than the temperature of the cryogenic liquid. If the carrier gas boiling point is equal to the temperature of the cryogenic liquid, the carrier gas is not condensed as it passes into the cryogenic liquid. Once a particular portion of the carrier gas reaches the liquid temperature, heat transfer ceases and the gas forms a bubble at equilibrium with the surrounding liquid. Of course, if the boiling point of the carrier gas is lower than the cryogenic liquid temperature, the carrier gas likewise is not condensed. Because the carrier gas is not condensed, it is not entrapped in the solid aromas.

It is believed that the use of a non-condensing carrier gas aids in providing the desired aroma in the final product. Although the present invention is not limited by any theory of operation, it is believed that because the solid aromas recovered in the trap do not have any significant proportion of condensed carrier gas entrapped within the solid matrix, there is no appreciable stripping of aromas by volatilized carrier gas upon warming.

Substantially all of the aromas reaching the trap are condensed and recovered in solid form. So long as the cryogenic liquid is maintained at about $-195°$ C. or below, and the downstream end of the trap remains immersed in the cryogenic liquid, there is no detectable loss of aromas in the gas exhausted from the trap, regardless of the gas flow to the trap. The carrier gas flow rate through the stripping chamber is selected to provide optimum stripping of the aromas from the roast coffee.

The rate at which aromas can be stripped from the roast and ground coffee is limited by the rate of diffusion from the interior of the coffee particles to the surfaces of the particles. Beyond a certain practical threshold, increasing carrier gas flow rates do not appreciably increase the efficacy or speed of the stripping step. Although some increase in aroma yield at the trap may be detectable by analytical instruments with gas flows beyond the threshold, the effect is so slight that differences in the flavor and aroma impact of the final beverage incorporating the recovered aromas are not detectable by expert tasters. With roast and ground coffee of about 1-3 mm mean particle size maintained between about 60° C.-82° C., this practical threshold lies at a carrier gas flow rate of between 64 liters and about 136 liters of carrier gas per hour per kilogram of roast coffee present in the stripping chamber. Accordingly, flow rates in that range are preferred. Gas quantities and flow rates referred to in this disclosure should be understood as measured at or converted to standard conditions, viz., 0° C. and 760 mm Hg absolute pressure.

Carrier gas flow rates higher than the threshold range may be used without loss of aromas, but such flow rates increase heat transfer to the cryogenic liquid and hence increase the cost of the process. Carrier gas flow rates less than the threshold range provide less effective stripping and hence less effective aroma recovery, although substantial aroma recovery may still be obtained at gas flows as low as about 8 liters per hour per kilogram of roast and ground coffee. The ability to use flow rates up to and beyond the threshold range while providing essentially complete condensation without appreciable loss at the trap is a major advantage of the present process.

The efficacy of the stripping step increases with increasing temperature, but the aromas in coffee tend to degrade at temperatures above 82° C. Accordingly, the coffee preferably is maintained at about 60° C. to about 82° C. during the stripping step. However, appreciable stripping and recovery may be obtained at coffee temperatures down to about 20° C. and below.

The efficacy of the stripping step also increases as the duration of the stripping step increases, but the amount of additional aromas as stripped per unit time gradually decreases toward the end of the process. For roast and ground coffee of about 1 mm-3 mm particle size, appreciable stripping can be accomplished in as little as 15 minutes or less, and there is some additional stripping with additional stripping time even beyond 3 hours. For a practical balance between stripping time and efficacy of aroma recovery, however, stripping times between about 15 minutes and about 3 hours are preferred, and stripping times between about 1 hours and about 2 hours are more preferred. In a batch process, the batch is retained in the chamber for the desired stripping time. In a continuous process, the coffee is continually fed into and through the stripping chamber by an appropriate conveyor so that each portion remains in the chamber for the desired stripping time.

The extraction processes employed in industrial production of soluble coffee typically use particles of roast coffee between about 1 and 3 mm mean size, obtained by conventional grinding of roast coffee beans. Use of such particles in the present aroma recovery process is preferred so as to facilitate extraction of the roast and ground coffee and hence conversion into soluble coffee after the stripping step. However, finer or coarser particles may be employed in the present aroma recovery process. If finer particles are employed, the threshold carrier gas flow rate increases and the preferred stripping time range decreases. Because some aromas typically are liberated in the grinding operation, aroma recovery may be enhanced by directing gases evolved in the grinding operation through the trap, as by directing the carrier gas through the grinder before it is introduced into the stripping chamber.

Preferably, the roast and ground coffee has a moisture content of about 1½% to about 2½% by weight at the beginning of the stripping operation. Coffee prepared by conventional roasting and grinding operations typically has a moisture content in this range. There is no need to moisten the coffee prior to or during the stripping step. The ability of the present process to provide effective aroma recovery without addition of moisture represents a significant advantage, as added moisture can promote degradation of the aromas.

Tea may be processed in substantially the same way as coffee. However, the aromas in tea typically are less volatile than those in coffee. Accordingly, stripping times, stripping temperatures and carrier gas flow rates for tea are typically toward the high ends of the ranges mentioned above with reference to coffee, or somewhat higher. Aroma-binding substrates for use with tea aromas include tea extract, soluble tea powder, edible oils, carbohydrates and combinations thereof in frozen particulate form. Ordinarily, tea to be stripped is in the form of black tea leaves, as utilized for ordinary commercial extraction processes in production of soluble tea. Other aroma-bearing vegetable materials also may be processed according to the present invention.

It is desirable to exclude oxygen from the gas stream reaching the trap so as to preclude condensation of liquid oxygen and hence prevent potential safety hazards posed by accumulation of liquid oxygen in the cryogenic liquid. Thus, the system should be purged with the carrier gas before the gas stream is directed to the trap. If the system is operated on a continuous basis, the stripping chamber should be maintained continually under positive pressure to exclude oxygen. It may also be necessary to change the cryogenic liquid periodically to remove accumulated liquid oxygen.

The following examples are intended to illustrate certain aspects of the present invention.

EXAMPLES 1-6

A batch stripping chamber and trap arrangement as illustrated are employed with roast coffee having a mean particle size of about 2.2 mm. Blends "A" and "B" are different blends comprising beans from different growths. In each case, the trap contains a substrate consisting of 2 parts concentrated coffee extract (45% solids) and 1 part coffee oil. The recovered aromas are incorporated in the same amount of soluble coffee powder by the same technique in each case. The "Powder GC" value for each example represents the total peak count observed in gas chromatography, using the same procedure for each sample of soluble coffee powder. Higher Powder GC values represent greater aroma contents. The sample of soluble base powder prepared for incorporation of aromas in Examples 5 and 6 has a Powder GC value of $0.44 \times 10^7$. The "Aroma Liberation %" figure for each example represents the percentage of the total aromas in the roast and ground coffee removed in the stripping step as determined by total peak counts in gas chromatography before and after stripping.

| Example | Carrier Gas Flow Rate* | Roast and Ground Coffee Temp. (°C.) | Stripping Time (hr) | Roast and Ground Coffee Blend | Powder GC | Aroma Liberation % |
|---|---|---|---|---|---|---|
| 1 | 136 | 82° | 1 | A | $2.09 \times 10^7$ | 48% |
| 2 | 68 | 82° | 1 | A | $2.03 \times 10^7$ | 43% |
| 3 | 136 | 60° | 1 | A | — | 29% |
| 4 | 68 | 60° | 1 | A | $1.63 \times 10^7$ | 24% |
| 5 | 68 | 82° | 2 | B | $2.03 \times 10^7$ | 53% |
| 6 | 68 | 18° | 2 | B | $0.99 \times 10^7$ | 25% |

*Liters per hour per kg. of roast and ground coffee in the stripping chamber.

EXAMPLE 7

Black tea leaves are processed using the same apparatus as in Examples 1–6. The tea leaves are maintained at about 82° C. during the stripping operation. Carrier gas is passed through the stripping chamber at a rate of about 136 liters per hour per kilogram of leaves in the chamber. The stripping and condensation operations are continued for about 3 hours. A substrate comprising one part edible oil and ten parts concentrated tea extract (45% solids) is employed in the trap.

What is claimed is:

1. A process comprising obtaining and separating aromas from an aroma-bearing particulate vegetable material and directing the aromas to a trap having a screen member immersed in a cryogenic liquid via a carrier gas which is non-condensing in the cryogenic liquid, such that the carrier gas flows through the screen member of the trap and such that the aromas are collected by the screen member in the trap in contact with the cryogenic liquid, and then removing the collected aromas in a solid form from the cryogenic liquid.

2. A process as claimed in claim 1 wherein the aromas are obtained by stripping the vegetable material of aromas in a stripping chamber.

3. A process as claimed in claim 2 wherein the vegetable material is roast and ground coffee.

4. A process as claimed in claim 3 wherein the carrier gas is passed through the coffee at a flow rate of at least about 8 liters per hour per kilogram of roast and ground coffee in the stripping chamber.

5. A process as claimed in claim 4 wherein said flow rate is at least about 64 liters per hour per kilogram of roast and ground coffee in the stripping chamber.

6. A process as claimed in claim 4 wherein the roast and ground coffee is maintained at a temperature between about 60° C. and about 82° C. during the stripping step.

7. A process as claimed in claim 4 wherein said stripping step is performed during a period of between about 15 minutes and about 3 hours.

8. A process as claimed in claim 3 wherein the aromas are obtained by passing the carrier gas through the coffee at a flow rate of at least 64 to about 136 liters of carrier gas per hour per kilogram of coffee at a temperature of about 60° C. to 82° C.

9. A process as claimed in claim 1 further comprising the step of blending the solid aromas with a blending liquid by immersing the solid aromas in the blending liquid.

10. A process as claimed in claim 1 wherein an aroma-binding substrate is disposed with the screen member of the trap in the cryogenic liquid.

11. A process as claimed in claim 10 wherein said substrate includes an aroma-binding adsorbent selected from the group consisting of edible oils, carbohydrates, coffee extract, soluble coffee powder, tea extract, soluble tea powder and combinations thereof.

12. A process as claimed in claim 1 further comprising condensing at least some of the constituents of the aroma-laden carrier gas prior to directing the aromas to the trap.

13. A process as claimed in claim 12 wherein at least water is condensed from the aroma-laden carrier gas prior to directing the aromas to the trap.

14. A process as claimed in claim 1 further comprising incorporating the collected aromas into a blending liquid.

15. A process comprising obtaining and separating aromas from aroma-bearing particulate vegetable materials, directing the aromas via a carrier gas to a trap having a screen member immersed in a cryogenic liquid which is maintained at a temperature not higher than about −195° C. and wherein the carrier gas has a boiling point not higher than the temperature of the cryogenic liquid such that the carrier gas flows through the screen member of the trap and does not condense in the cryogenic liquid as the carrier gas passes into and through the cryogenic liquid as the aromas are collected by the screen member in the trap in contact with cryogenic liquid, and then removing the collected aromas in a solid form from the cryogenic liquid.

16. A process comprising obtaining and separating aromas from aroma-bearing particulate vegetable materials, directing the aromas via a carrier gas to a trap having a screen member immersed in a bath of liquid nitrogen maintained in equilibrium at its atmospheric-pressure boiling temperature wherein the carrier gas has a boiling point not higher than the maintained temperature of the liquid nitrogen such that the carrier gas flows through the screen member of the trap and does not condense in the liquid nitrogen as the carrier gas passes into and through the liquid nitrogen as the aromas are collected by the screen member in the trap in contact with the liquid nitrogen, and then removing the collected aromas in a solid form from the liquid nitrogen.

* * * * *